United States Patent [19]

Kellie

[11] 4,138,793
[45] Feb. 13, 1979

[54] FISHING FLOAT

[76] Inventor: William J. Kellie, 418 N. Lewis, Port Angeles, Wash. 98362

[21] Appl. No.: 815,210

[22] Filed: Jul. 13, 1977

Related U.S. Application Data

[63] Continuation-in-part of Ser. No. 674,907, Apr. 8, 1976, abandoned.

[51] Int. Cl.² ............................................. A01K 91/00
[52] U.S. Cl. .................................. 43/43.13; 43/44.92
[58] Field of Search ............................. 43/43.13, 44.92

[56] References Cited

U.S. PATENT DOCUMENTS

| | | | |
|---|---|---|---|
| 2,226,004 | 12/1940 | Lockert | 43/43.13 |
| 2,901,857 | 9/1959 | Lockert | 43/43.13 |
| 3,067,539 | 12/1962 | Black | 43/43.13 |
| 3,902,268 | 9/1975 | Talbot | 43/44.92 |

*Primary Examiner*—Nicholas P. Godici
*Assistant Examiner*—James G. Smith
*Attorney, Agent, or Firm*—Graybeal, Barnard & Uhlir

[57] ABSTRACT

This float is for commercial fishing trollers and is adjustable so that the same float, after adjustment, may be used with a starboard or port sheer line or a straight line of a multiple line, trolling system. The float element is a relatively long, tall, and thin prism or parallelepiped having desired rigidity and density - the latter to cause it to float high in water. When in use with a fishing, trolling line, it floats with its thin dimension horizontal, thus standing vertical on one of its narrow side surfaces. A bottom plate is connected with the float. In a first embodiment, four holes extend through said plate, with a pair thereof at each end portion thereof, one of each pair toward the center crosswise considered and the others of both pairs toward the same side. An end hook for pivotally mounting an end portion of a rod is detachably connected to a selected hole at each end portion of the float. A center pivot support is mounted on said plate. A rod having a center U-bend, as a handle, is pivotally mounted at its center on said center pivot support and at its end by said hook members. The rod end portions are arcuately bent to form, with other holes in the plate, guides for a fishing line. Locking means are provided to cooperate with the rod handle portion when the rod is turned until the rod handle is flush with said plate.

In a second embodiment, a mounting ear is fixedly attached transversely to each end of the bottom plate to extend laterally beyond the side of said bottom plate. Three pairs of holes are spaced along the length of each mounting ear, with one pair of said holes located in the portion of said mounting ears extending laterally beyond the sides of the bottom plate. An end hook for pivotally mounting the rod near its ends is detachably connected to a selected hole of the said pair of mounting plate holes. The corresponding rod end portions, which guide the fishing line, are engageable into the remaining hole of the said pair of mounting plate holes. Furthermore, the center pivot support can be angularly adjusted on respect to the bottom plate so that the orientation of said center pivot support corresponds to the selected orientation of the rod. The float body, moreover, is provided with a slot or hand-hold through which the float can be held while it is being attached to or detached from a moving fishing line.

14 Claims, 13 Drawing Figures

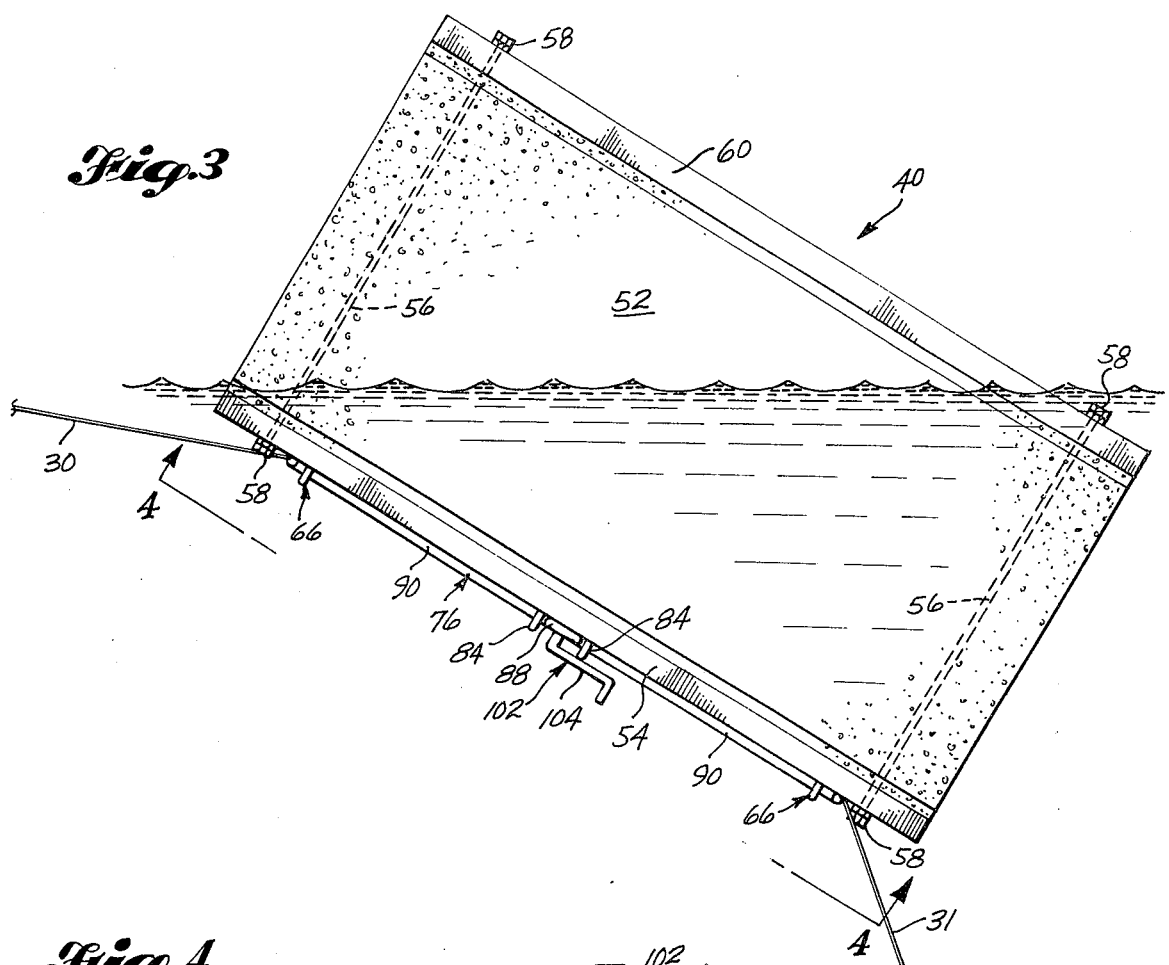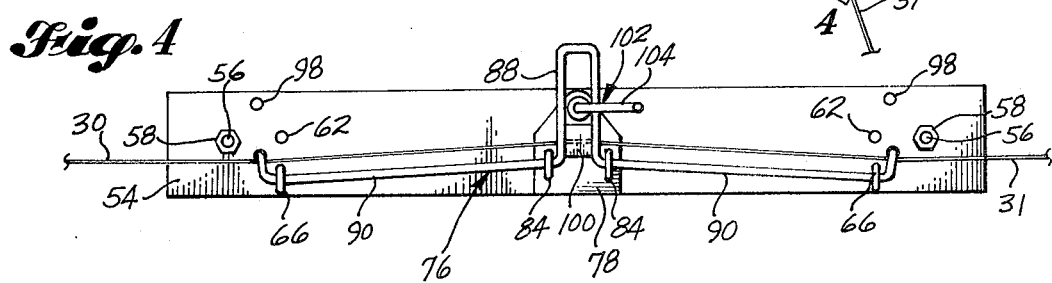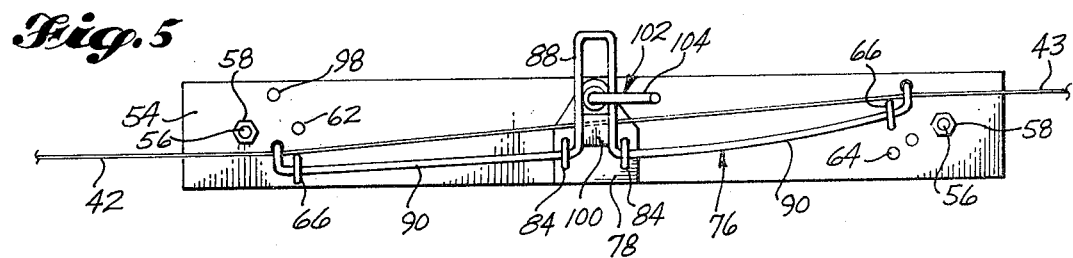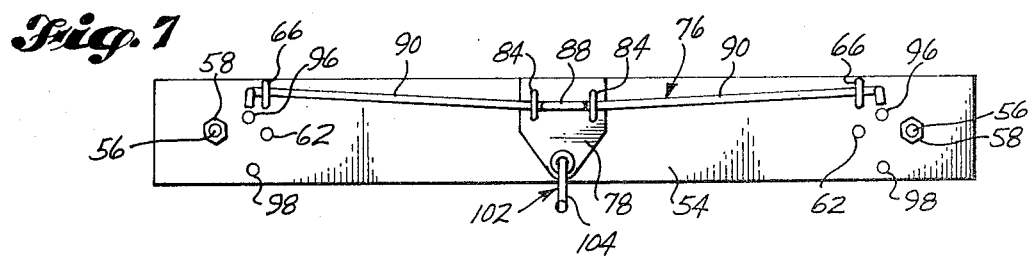

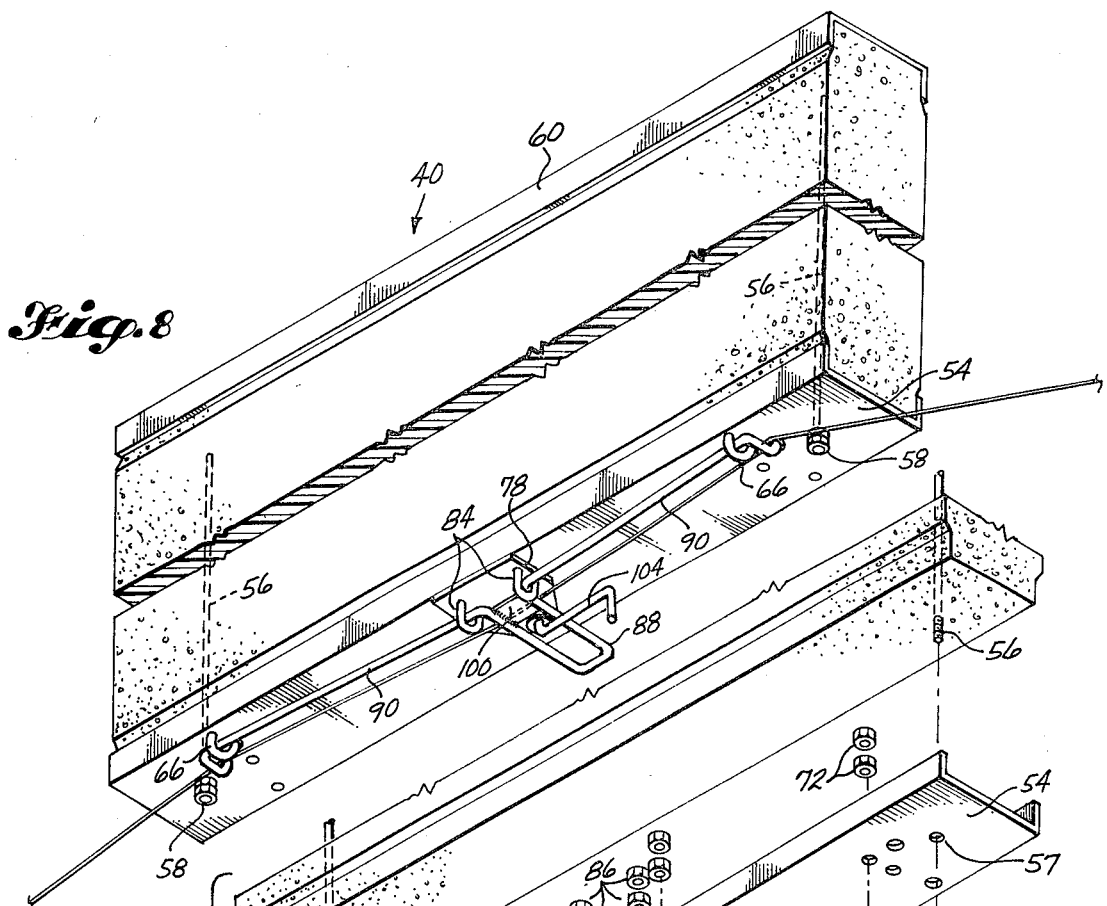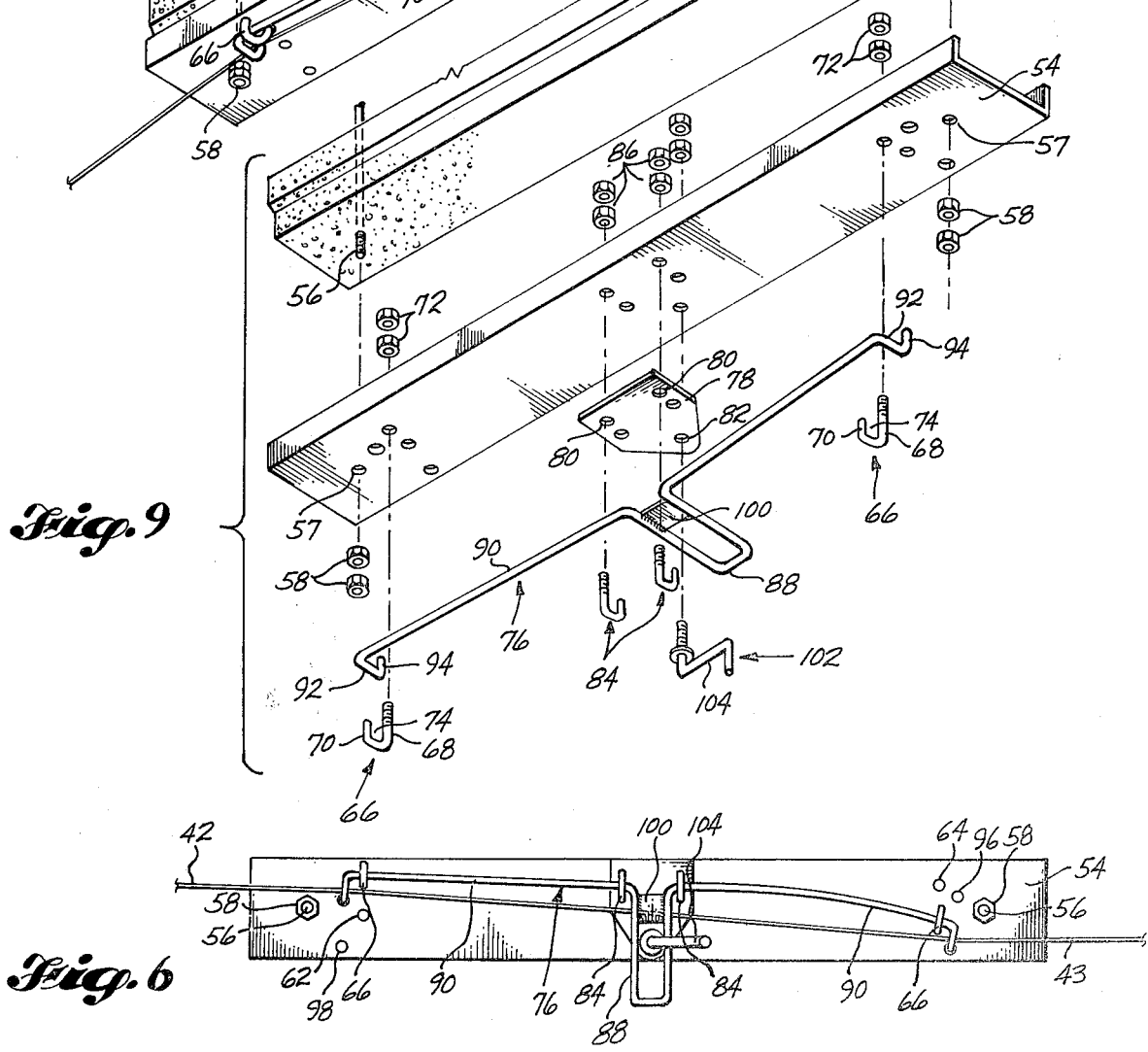

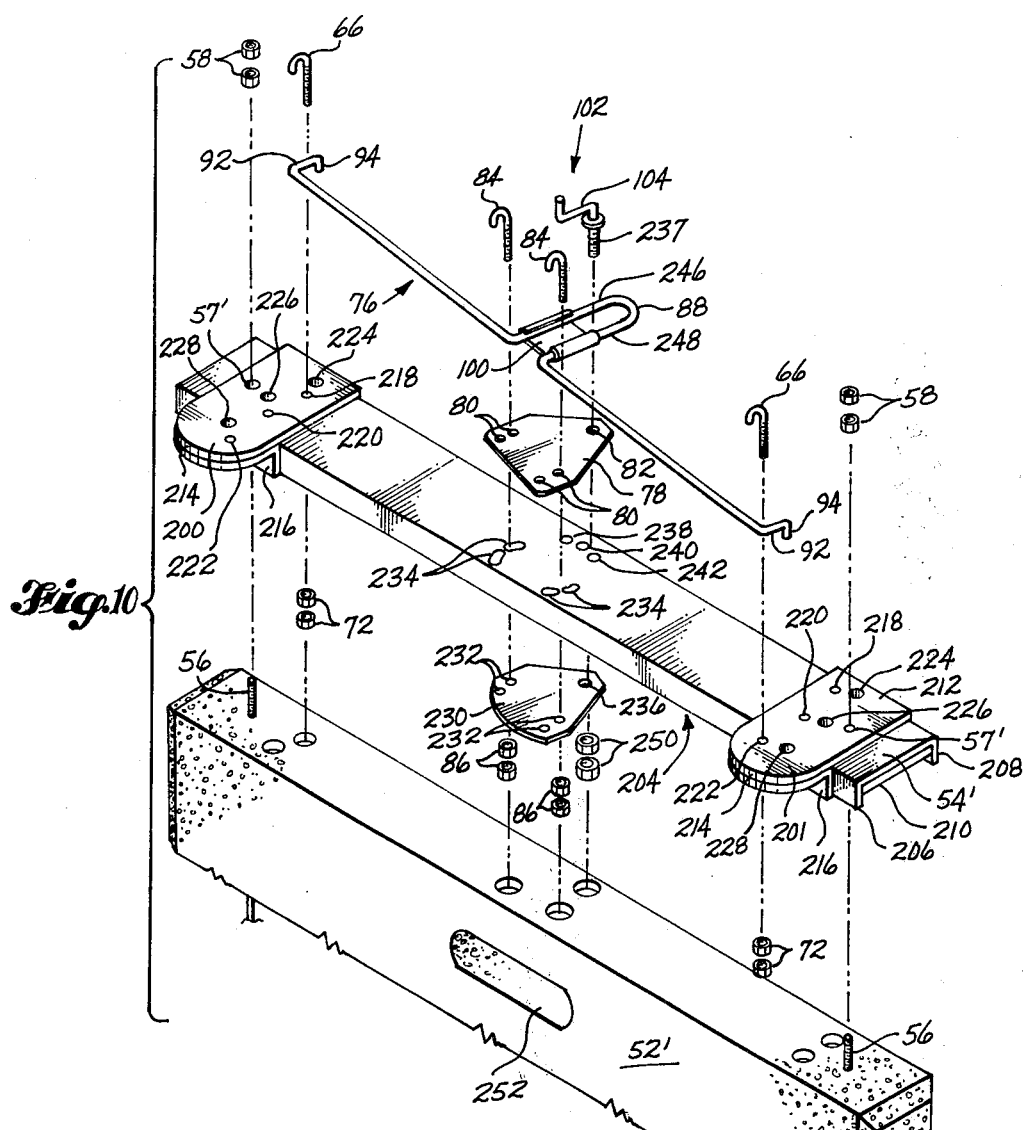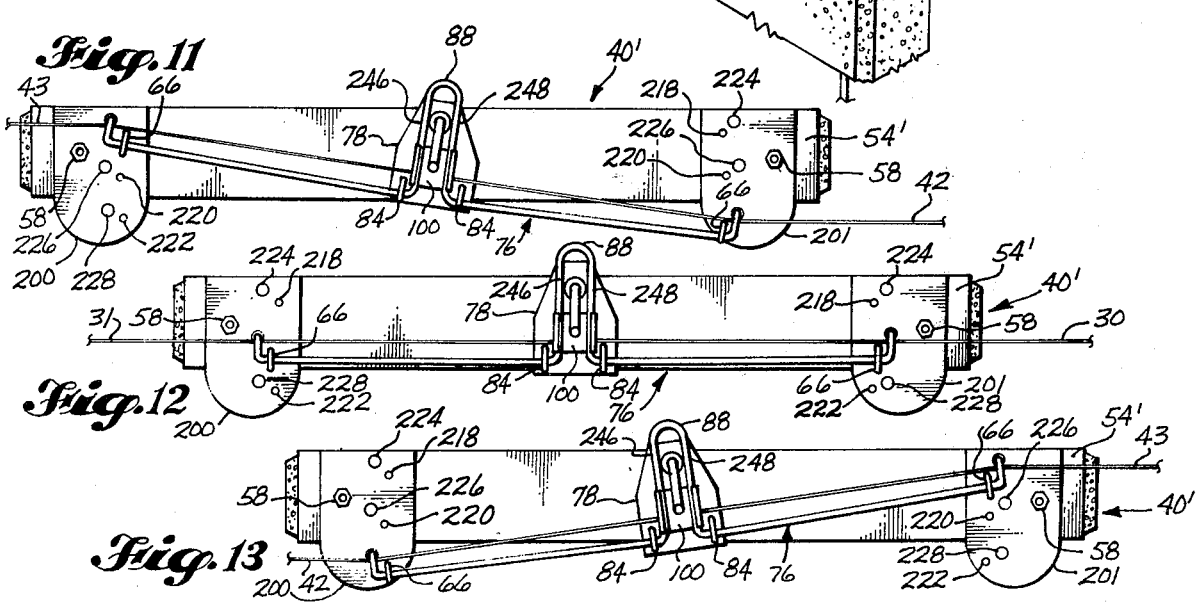

FISHING FLOAT

BACKGROUND OF THE INVENTION

Cross-Reference to Related Application

This present application is a continuation-in-part of my co-pending application, Ser. No. 674,907, filed Apr. 8, 1976, now abandoned.

Field of the Invention

This invention relates to fishing line floats used in commercial trolling for fish, and in particular, to such a float which is capable of being used in conjunction with fishing lines on both the port side and the starboard side of the fishing boat.

Description of the Prior Art

In commercial trolling for fish, it is common to have two fishing booms extending laterally from each side of a fishing boat. A plurality of tag lines connect between each of said booms, and on each side thereof, to a plurality of gurdy lines, the latter connected to a winch or the deck of a fishing boat. The lengths of tag lines are such that the gurdy lines can be reeled onto a winch on the deck of a vessel and a fishing line, connected to the juncture of the tag line and the gurdy line, can be reeled onto the boat and then the fishing line involved reeled in.

Generally, three fishing lines are towed from each side, port and starboard, of the boat. One of the fishing lines is the deep fishing line (which fishes at the greatest depth of water) and is towed nearest to the boat and comprises a deep line towing a weight or lead ball at the end thereof and a plurality of relatively short, sidewise extending fishing leaders which have a fishing lure or lures thereon. The length of the deep line, the weight of the lead ball used, and the trolling speed will determine the depth of fishing and are adjusted to meet the needs of the fishermen. However, generally, the fishing lines are operated at different depths and of the depths fished, this line will operate at the greatest depth.

The next fishing line disposed in further sidewise relation and on each side of the boat will be a straight fishing line. This straight line comprises a straight line connected at the juncture of a tag line and a gurdy line and at a location sidewise or laterally and aft of the connection between the tag line, gurdy line, and deep line to eliminate interference between the lines. The straight line extends to a float, thence to a fishing line having a plurality of relatively short, sidewise extending leaders which have a fishing lure or lures thereon, and thence to a weight or lead ball. Again, the lengths of the line and the mass of the lead ball determine the depth of the fishing. The fisherman will determine the desired fishing depth but, generally, the straight line will fish at a different and higher elevation than the depth of water fished by the deep line. The float on this line, in the prior art, is constructed so as to "steer" this line in a straight attitude so far as trailing from its juncture between it, its tag line, and its gurdy line.

The next fishing line disposed in further sidewise relation and on each side of the boat will be a sheer fishing line. This sheer line comprises a sheer fishing line connected to the juncture of a tag line and a gurdy line and at a location sidewise or laterally and aft of the connection between the tag line, gurdy line, and straight line to eliminate interference between lines. The sheer line extends to a float, thence to a fishing leader having a plurality of relatively short, sidewise extending fishing lines having a fishing lure or lures thereon, and thence to a weight or lead ball. Again, the length of the lines, the mass of the lead ball, and trolling speed will determine the depth of fishing and again a judgment decision of fishing depth will be made by the fisherman. The float on this line was constructed to operate on a sheer line and "steer" or guide the sheer line in an attitude outward from the straight line.

It is a distinguishing feature of this invention to provide such a fishing float which is adjustable and the same float, upon adjustment, may be used either as a float for a straight fishing line or a float for a sheer fishing line.

It is also a distinguishing feature of this invention to provide a fishing float which tends to veer away from the fishing boat a distance further than that presently possible using known floats.

In the past, single-location fishing floats have been used in conjunction with either a straight fishing line, or a port side or starboard side sheer fishing line, but never has the same float been useable in conjunction with all three such lines. An obvious disadvantage of single-location fishing floats is that fishermen have had to carry additional floats for each fishing line. This practice is not only expensive, but also takes up extra space which is often not available on generally cramped fishing boats. Furthermore, if a particular float is lost or damaged and no like replacement float is available to the fisherman, valuable fishing time may be lost while returning to port to obtain a replacement float. Moreover, fish are not always easily locatable, and thus when they are found, a fisherman would not want to leave the area to obtain a replacement float.

It is desirable that the sheer line float extend laterally from the boat a distance adequate to insure that it does not become entangled with the straight line. It is, furthermore, desirable to maintain the sheer fishing line a distance laterally away from the boat so that a wide path is swept by the fishing line while the boat is trolling. These goals must be accomplished without a float which is expensive to design or manufacture, or which is so wide that its drag resistance is increased an inordinate amount. Examples of single-position type floats for fishing lines are disclosed by the following U.S. Pats:

No. 2,226,004, granted Dec. 24, 1940 to J. D. Lockert;

No. 2,901,857, granted Sep. 1, 1959 to J. D. Lockert;

No. 3,067,539, granted Dec. 11, 1962, to Della I. Black; and

No. 3,902,268, granted Sep. 2, 1975 to Earl A. Talbot.

These patents and the prior art that was cited and considered by the Patent Office before granting them, which is listed on these patents, should be consulted to properly evaluate the subject invention and to put it into proper perspective.

SUMMARY OF THE INVENTION

This invention provides a fishing line float for commercial fishing trolling lines, and the float is relatively tall, thin, and long so as to provide a guide or positioning means to determine the attitude or direction of a fishing line. This float is adjustable so that it can be used as fishing, trolling straight or a fishing, trolling sheer line float. Specifically, in the first embodiment, a bottom surface plate is provided, which plate is provided with a pair of holes at each end portion thereof to detachably mount therein an end hook member for pivotally mounting the end portion of a rod. The rod is provided with a central locking portion, preferably as a U-shaped bend thereof extending at right angles to the main body portion of the rod. The end portions of the rod are arcuately bent and form guides movable into cooperative engagement with the bottom surface plate under which guides, a fishing line may be threaded for use either with a straight or sheer fishing line. The position of the rod guide portions depends upon the hole in the bottom plate in which the hook members are positioned and secured thereto.

In a second embodiment, a mounting ear is fixedly attached to each end of the bottom plate to extend laterally beyond the side of said bottom plate. A plurality of pairs of holes are provided in each mounting ear and are spaced along the length of the mounting ear a distance greater than the width of the bottom plate. An end hook is detachably fastened to each mounting ear through the inside hole of a selected pair of the mounting ear holes for pivotally mounting the end portions of the rod. Terminal end portions of the rod, which form guides for the fishing line, are engageable into the corresponding outer hole of the selected pair of holes. As in the first embodiment, the lengthwise orientation of the rod, and thus the fishing line, in respect to the float, is dependent upon the particular inside hole and the particular mounting ear in which the end hook members are positioned and secured. A central mounting plate assembly is rotatively connectable to the bottom plate in selected positions corresponding to the lengthwise angular orientation of the rod, which mounting plate assembly carries a plurality of central hooks near the handle portion of the rod and in cooperative alignment with the end hooks for pivotally mounting a rod to the bottom plate assembly. Also carried by the central mounting plate assembly is a latch which engages with the U-shaped handle of the rod to maintain the rod end portions in cooperative engagement with the mounting ears.

It is an object of the present invention to provide a fishing float which is adjustable, and the same float, upon adjustment, may be used either as a float for a straight fishing line or a float for a sheer fishing line on either the port side or the starboard side of a fishing boat.

Another object of the present invention is to provide a fishing float which, in use, will guide or steer a sheer fishing line laterally of a fishing boat a distance greater than presently possible using existing floats.

A further object of the present invention is to provide a low-cost, easy-to-manufacture, fishing float constructed from a minimum of component parts.

Still another object is to provide a fishing float which can be easily and conveniently supported while being attached to and detached from a moving fishing line.

Other objects and advantages of the invention will become explicit or implicit as the description thereof proceeds in detail in connection with the accompanying drawings.

DESCRIPTION OF THE DRAWINGS

FIG. 3 is an elevational view, and on a larger scale, of one of the floats of this invention;

FIG. 4 is a bottom plan view taken substantially on broken line 4—4 of FIG. 3, and shows the device adjusted to operate in connection with a fishing, trolling straight line;

FIG. 5 is a view similar to FIG. 4, except the device has been adjusted to operate in connection with a fishing, trolling sheer line and used on the port side of a fishing boat;

FIG. 6 is a view similar to FIG. 4, except the device has been adjusted to operate in connection with a fishing, trolling sheer line used on the starboard side of the fishing boat;

FIG. 7 is a bottom plan view, with the device rotated 180° over the position shown in FIGS. 4 and 5, and with the line control and guide rod disposed in open or line release position;

FIG. 8 is a perspective, bottom view, with parts broken away, of the float;

FIG. 9 is an exploded perspective view of the structure of FIG. 8;

FIG. 10 is an exploded perspective view of an embodiment of the present invention showing the fishing float rotated 180° about its longitudinal axis;

FIG. 11 is a bottom plan view of the float in FIG. 10, and shows the float adjusted to operate in cooperation with a fishing, trolling sheer line located on the starboard side of the fishing boat;

FIG. 12 is a view similar to FIG. 11, with the float adjusted to operate in conjunction with a fishing, trolling straight line;

FIG. 13 is a view similar to FIG. 11, with the float adjusted to operate in conjunction with a fishing sheer line located on the port side of the fishing boat.

DESCRIPTION OF A PREFERRED EMBODIMENT

Figure 1:
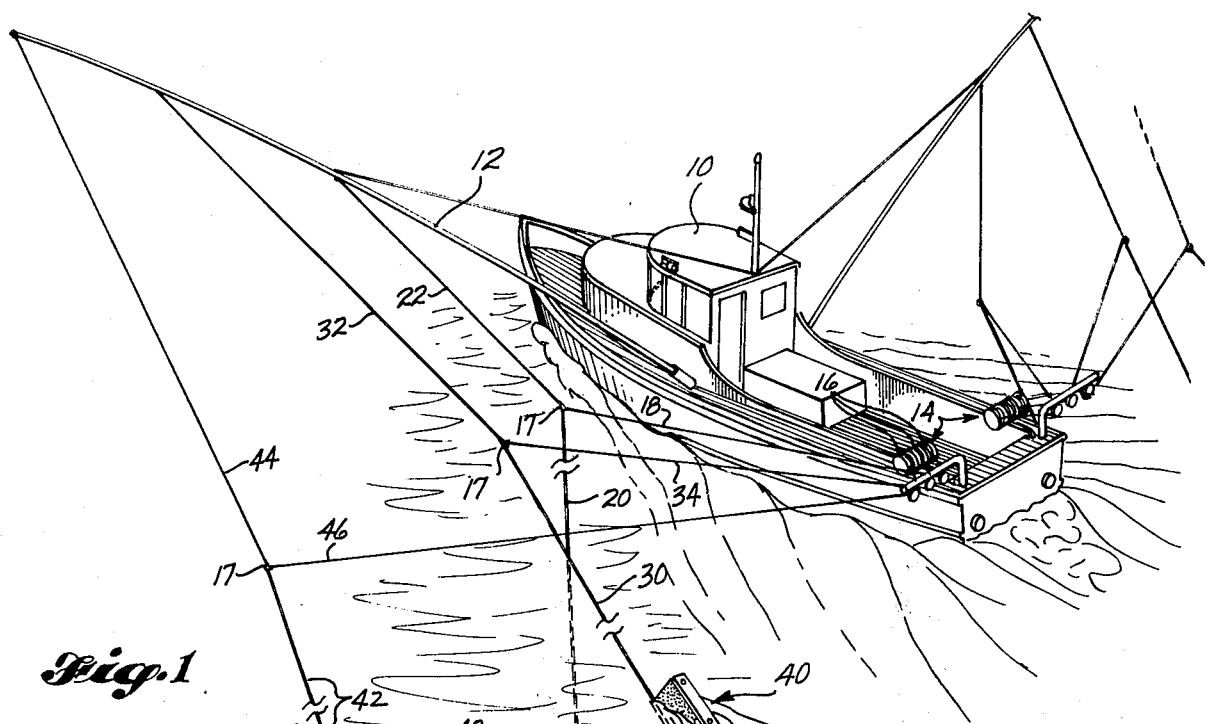
FIG. 1 is a perspective and somewhat schematic view, and with parts broken away, illustrating devices and uses of the invention and particularly those on the port side of the fishing boat illustrated.
Figure 2:
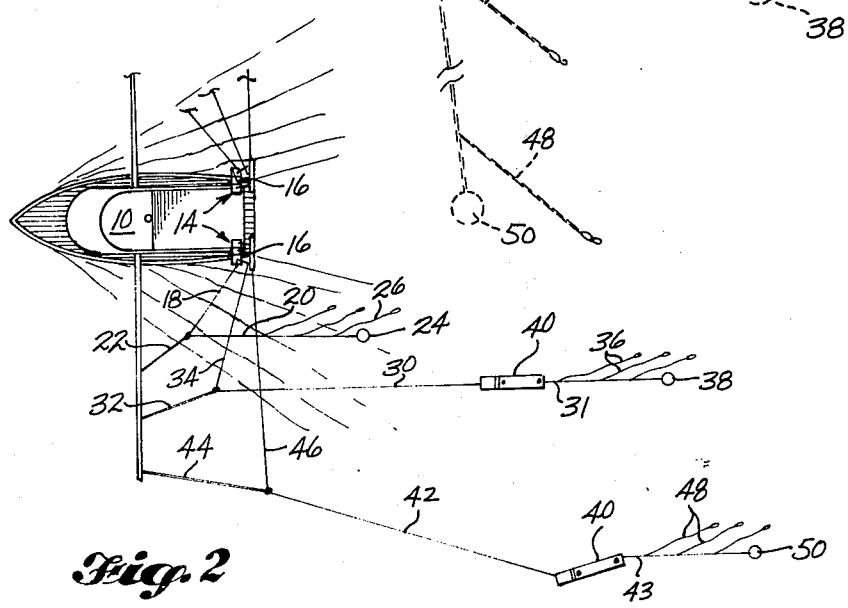
FIG. 2 is a plan view of the structure of FIG. 1.

In FIGS. 1 and 2, a trolling vessel 10 is illustrated as having the usual fishing trolling equipment as trolling poles 12 extending outwardly to the port and starboard of the vessel 10. The equipment, or gear, may be the same on both sides of the vessel 10 and the drawing is complete on the port side, which will thus illustrate both sides, even though parts are broken away on the starboard in the interest of a clearer drawing to a larger scale. Also, power hoists or gurdies 14, having a plurality of separately operable spools or drums 16, are provided. A gurdy line 18 connects with a line snap 17 which provides the juncture between a deep line 20 and a tag line 22, the latter being connected with and towed directly by the port fishing pole 12. The deep line 20 terminates with a weight or lead ball 24. A plurality of lateral fishing lines or leaders 26, having fishing lures 28 thereon, are connected with deep line 20. The length of deep line 20 and the weight of the lead ball are considered by the fisherman in connection with the selected trolling speed as the greatest depth the fisherman feels it is wise to fish. The length of the gurdy line 18 and the tag line 22 are such that the line snap 17 therebetween may be pulled toward the fishing vessel 10, unsnapped, and then the deep fishing line 20 is pulled in by the appropriate drum or spool 16 of the power hoist 14, when this is deemed advisable by the fisherman, such as to check lures, remove caught fish, remove debris from the fishing lines and gear, and the like.

A second line, laterally positioned and further outwardly in a port direction of the deep line 20, may be a straight line, having portions 30, 31. The fishing gear for the straight line 30, 31 may comprise a tag line 32, gurdy line 34 connected with tag line 32 by a line snap 17, and fishing leader and lures 36, and lead weight 38. Also, a float, generally numbered 40, is connected between the straight line portion 30 (connected with tag line 32 and gurdy line 34) and straight line portion 31 connected with fishing leaders 36. The float 40 steers or maintains straight line 30, 31 in proper sidewise alignment with the remaining fishing lines. The structure and mode of operation of the float 40 constitutes the subject matter of the present invention and will be later discussed in detail. The length of fishing line portion 30 to float 40, and fishing line portion 31 from float 40 to lead weight 38 and the weight thereof are determined by the fisherman, again in combination with the trolling speed as providing the fishing depth desired for the straight line 30, 31.

A third fishing line having portions 42, 43, called a sheer fishing line, is disposed to operate further laterally to the port than straight line 30, 31. The gear on sheer fishing line 42, 43 comprises a tag line 44, gurdy line 46, connected by a line snap 17 with tag line 44, and sheer fishing line portion 42, 43. Lateral fishing leaders and lures 48, and lead weight 50 are connected with sheer fishing line portion 43. A float 40 is interposed between sheer fishing line portions 42, 43. Such float 40 is adjusted differently than the float 40 used in connection with the straight line 30, 31, as will later appear herein and is adjusted so sheer line 42, 43 will be maintained in the proper attitude laterally or the port of straight line 30, 31 to prevent line entanglement.

The gurdy lines 34 and 46 connect with suitable drums or spools of the power hoist unit 14 so that the straight line 30, 31 and/or sheer line 42, 43 and/or deep line 20 may be reeled in as desired by the fisherman.

From the foregoing, the operation of the starboard, deep, straight, and sheer fishing lines will be obviously apparent without repetition of the comparative modes of operation thereof and is incorporated by reference without undue repetition.

Reference is now made to FIGS. 8 and 9 and the details of the construction of the float of this invention. The float 40 comprises a body member 52, which is relatively long, tall, and narrow and in the form of a prism or a parallelepiped and is formed of foam or other material of proper density, so that during operation thereof and with the weight and drag of the fishing gear, a substantial portion of the float 40 will be above the water and visible from the fishing vessel 10. Also, the side walls of each float 40 are sufficiently extensive and the float has a narrow enough width so that float 40, when properly adjusted, will guide and maintain a fishing line in the proper lane of vessel 10. Floats per se, but not adjustable floats, are old in the art, and thus no further description of floats generally will be given.

A bottom plate 54 and a top plate 60 are detachably connected with the body member 52 by bolt means 56 disposed at opposite ends of the body member 52 and extending through holes 57 in the plates 54 and 60 and through the body member 52 and by removable nut means 58 on the end portions of the bolt means 56. The plates 54 and 60 and other plates used are made of a plastic or of suitable metal to resist corrosion. Also, the nuts 58 are double, to function as lock nuts. Body 52 is compressible, so said double nuts, which bear against the surfaces 54 and 60, will maintain the integrity of the structure.

A pair of holes 62 and 64 extend through bottom surface plates 54 and at each end portion thereof. The holes 62 are substantially central, laterally considered, of the bottom plate 54, and the holes 64 are to one side of such center. An end hook 66 (see particularly FIG. 9) has a threaded shaft portion 68 and a short shaft portion 70. The threaded shaft portion 68 of an end hook 66 is positioned through a hole 62 or 64, the short shaft portion 70 butted against plate 54 and then double nuts 72 on threaded shaft 68 connect the end hook 66 to the bottom plate surface 54 leaving an eye opening or bearing 74 in which a portion of a longitudinally extending rod 76 may be rotatively mounted.

A central mounting plate 78 has four holes 80 and a fifth hole 82 therethrough and matching holes in the bottom plate 54. This plate 78 is secured to plate 54 and eye openings or bearings are provided for longitudinally extending rod 76 by central hooks 84, which may be the counterpart of end hooks 66. These central hooks 84 are connected with mounting plate 78 and bottom plate 54 by having each leg of central hooks 84 extend through a hole 80 in both the plate 78 and the bottom plate 54 and then double nuts 86 are connected to the threaded legs of each of the central hooks 84.

A longitudinally extending rod member 76 is pivotally mounted for turning axially thereof in the eye openings or bearings provided by two end hooks 66 having their threaded shanks in either a hole 62 or a hole 64 at an end portion of the bottom plate 54. Also, the rod 76 has its center portion formed in a U-shape to function as a handle and a part of the locking mechanism. The central U-shaped portion 88 is connected with the main body rod portion 90 and, the end portions thereof connect with intermediate bent portions 92, which lie in the plane of the rod portions 90 and the U-shaped portions 88 and extend in a direction normal to the main rod portion 90. The rod 76 terminates at both ends with terminal arcuate end portions 94, which project at right angles to the intermediate bent portions 92. The rod 76 may be turned or angularly moved so that said portions 94 extend into holes 96 or 98, provided in the end portions of the bottom plate 54.

When an end portion of the rod member 76 is rotatively mounted on an end hook 66 held in a hole 64 through plate 54, then the rod end portion 94 is aligned to enter hole 96 in plate 54. A fishing line, as sheer fishing line 42, may lie against plate 54, between shaft 68 of hook member 66, and the terminal rod end portion 94, and be held by the portion of the rod 76 between portions 92 and 94. When the rod member 76 is rotatively mounted on an end hook 66 held in a hole 62 through plate 54, then the rod end portion 94 is aligned to enter a hole 98 in plate 54. A fishing line, as either a sheer fishing line 42 or a straight fishing line 30, may lie against the plate 54 between the shaft 68 of the hook member 66 and the terminal rod end portion 94, and be held by the rod portion between rod portions 92 and 94.

When a fishing line, as 30, 31 or 42, 43 is held by a portion of the rod 76, no matter which hole 62 or 64 that the shaft 68 of the two end hooks 66 are engaged into, the mid portion of the fishing line between the ends of the plate 54 is held by a line-engaging and reinforcing plate 100 connected to U-shaped portion 88 of rod 76 and which plate 100 is adjacent plate 78 when such plates are in line-engaging position. In line-engaging position, a fishing line 30, 31 or 42, 43 passes between mounting plate 78 and line-engaging plate 100 and is held therebetween when handle 88 is held in locked position by bell crank 102 as shown in FIGS. 4-6. A threaded leg of bell crank 102 extends through hole 82 in plate 78 and in plate 54. An arm portion 104 of such crank 102 is movable into lock position to bear against one leg of U-shaped portion 88 to hold said U-shaped portion 88 in engagement with plate 78. To unlock U-shaped portion 88 and permit turning of rod 76, the bell crank 102 is moved to a position between the legs of the U-shaped handle 88 and in such position, the handle 88 is free to turn and release a fishing line 30, 31 or 42, 32. Also, engagement of various portions of the rod 76 with a fishing line 30, 31 or 42, 43, prevents the float 40 from moving relative to its fishing line 30, 31 or 42, 43.

When a float 40 is used on a straight line 30, 31 either on the port or starboard side of the vessel 10, the adjustment is for a straight through line (see FIGS. 4 and 8), such as holding the line 30, 31 between plates 100 and 78; and holding the line 30, 31 between rod end portions 92 and 94 of rod 76 when the threaded shanks 68 of two hook members 66 are both in holes 64 at the ends of a plate 54.

When a sheer fishing line 42, 43 is used on the port side of vessel 10 (see FIG. 5), the threaded shank 68 of a hook 66 is positioned in a hole 62 at the trailing end portion of the float 40 and the terminal arcuate rod end portion 94 extends into a hole 98 in plate 54. At the same time, the threaded shank 68 of a hook 66 is positioned in a hole 64 at the forward end portion of a float 40 and the terminal arcuate rod end portion 94 at the forward end of the float extends into a hole 96 in plate 54.

When a sheer fishing line is used on the starboard side of the vessel 10 (see FIG. 6), the threaded shaft 68 of a hook 66 is positioned in a hole 64 at the forward end portion of the float 40 and the terminal arcuate rod end portion 94 extends into a hole 96 at the forward end portion in plate 54. At the same time, the threaded shaft 68 of a hook 66 is positioned in a hole 62 at the trailing end portion of the float 40 and the terminal arcuate rod end portion 94 extends into a hole 98 at the trailing end of the float 40 in plate 54.

It is desirable for a float to be capable of guiding or steering a sheer trolling line at a considerable distance laterally of the fishing boat. This capability will reduce the possibility that the sheer line will become entangled with the straight line, and will also enable a larger path to be swept by the fishing lines while the fishing boat is trolling.

The distance that a given float can steer or guide a sheer line laterally from a boat is directly related to the angle between the float and the rod which connects the fishing line to the float.

One obvious way to increase the angularity between rod 76 and float 40 is to shorten the rod so that it can be mounted on the float at a greater longitudinal angle with respect to the float 40 while still maintaining the rod terminal ends 94 anchored within the width of bottom plate 54. However, as the length of the rod 76 is shortened, the points at which the fishing line is connected to the front and rear of the float move closer together, and thus the possibility that the float 40 will yaw rather than track in a straight line is increased.

Alternatively, float body 52 itself and the bottom plates 54 could be widened so that a greater angle between the rod 76 and the float 40 could be obtained while not increasing the tendency of the float 40 to yaw. A wider float will, however, increase the drag forces acting on the float 40. Also, the increased weight of the larger float will make attaching and detaching the front from a fishing line more difficult for the operator.

An inexpensive float structure which is capable of steering or guiding a fishing line laterally further away from the boat without incurring the above disadvantages is shown in FIGS. 10 through 13. As best seen in FIG. 10, a bottom plate assembly 204, which is detachably mounted to the bottom surface of float 52', serves to mount rod 76 to float body 52. Said bottom plate assembly includes bottom plate 54' in the form of an elongated channel having a length substantially equal to the length of float body 52' and having flanges 206 and 208 for receiving float body 52' therebetween. Sandwiched between bottom plate 54' and the bottom surface of float body 52' is reinforcing plate 210 having a length substantially equal to that of bottom plate 54' and having a width sized to permit said reinforcing plate to be receivable between bottom plate flanges 206 and 208. Reinforcing plate 210 serves to strengthen bottom plate 54' against forces imposed on said bottom plate by the fishing line and ocean water during operational use of float 40'. Left mounting ear 200 and the right mounting ear 201 are transversely, fixedly attached in spaced parallel relationship to opposite ends of plate 54'. Said mounting ears have a straight end 212 which is located substantially flush with bottom plate flange 208 and an arcuate second end 214 extending laterally beyond bottom plate flange 206. A right angle brace 216 buttresses the laterally extending arcuate end 214 of mounting ears 200, 201 to bottom plate 54'. One leg of said brace has a shape corresponding to and lies contiguous to the surface of mounting ear arcuate end portion 214 facing bottom plate 54' and the other leg of angle brace 216 is contiguous to the other surface of bottom plate flanges 206. It is to be understood that braces constructed in other shapes can be provided to serve the same purpose as right angle brace 216. Furthermore, by constructing mounting ears 200, 201 and/or bottom plate 54' in a different manner, such as by making the mounting ears thicker, the need for a brace, such as angle brace 216, may be eliminated.

Located along the length of left mounting ear 200 and right mounting ear 201 are three pairs of holes, which holes also extend through corresponding portions of bottom plate 54' and angle brace 216. Said pairs of holes are positioned in left mounting ear 200 and right mounting ear 201 such that one hole of said pairs (herein termed the inside hole) is nearer to the longitudinal center of bottom plate 54' than the other hole (herein termed the outside hole). Said inside holes consist of hole 218, hole 200, and 222, positioned respectively along mounting ears 200 and 201 from straight end 212 to arcuate end 214. Corresponding to inside hole 218 is outside hole 224, to inside hole 220 is outside hole 226, and to inside hole 222 is outside hole 228. Inside hole 222 and outside hole 228, as best seen in FIGS. 11 through 13, are located in the portion of mounting ears 200 and 201 extending laterally beyond the envelope of float body 52'.

An end hook 66', for pivotally mounting rod 76 in the alternative lengthwise orientations in respect to bottom plate assembly 204 as shown in FIGS. 11-13, is detachably connected to each end of bottom plate assembly 204 through a selected inside hole 218, 220, and 222 in each mounting ear 200 and 201. Rod terminal ends 94 are engageable into the corresponding mounting ear outside hole 224, 226 or 228 when rod 76 is rotated about its longitudinal axis.

As shown in FIG. 10, a backing plate 230 is provided with four holes 232 in registry with the four holes 80 in central mounting plate 78. Aligned with said holes 232 and 80 are four slots 234 in bottom plate 54' and reinforcing plate 210. Central hooks 84, which cooperate with end hooks 66 to rotatably mount rod 76, are connected to bottom plate assembly 204 by having each leg of central hook 84 extend sequentially through a central mounting plate hole 80, a bottom plate slot 234, and a backing plate hole 232. Slots 232 in bottom plate 54' allow central mounting plate 78 and backing plate 230 to pivot about an axis normal to the plane of both of said plates so that central hooks 84 can be aligned with the particular lengthwise orientation of rod 76.

Backing plate 230 also has a fifth hole 236, as shown in FIG. 10, in registry with central mounting plate fifth hole 82 to receive therethrough threaded leg 237 of bell crank 102. Moreover, bottom plate 54' and reinforcing plate 210 have three holes 238, 240, and 242 for selectively receiving bell crank threaded leg 237 when central plate 78 and backing plate 230 are positioned to align central hooks 84 with the three angular orientations of rod 76 shown in FIGS. 11 through 13. Such figures also illustrate that when bell crank 102 is in locked position to hold U-shaped handle 88 of rod 76 in engagement with central plate 78, bell crank arm 104 lies between the legs 246 and 248 of said U-shaped handle and bears against line-engaging plate 100, rather than against one of said legs as shown in FIGS. 1 through 9. In this particular orientation, handle 102 is retained against shifting to unlocked position by legs 246 and 248 of handle 88. It can be appreciated that when central plate 78 and backing plate 230 are located to correspond to the lengthwise orientation of rod 76, because both central hooks 84 and crank 102 are carried by said central mounting plate and said backing plate, said crank 102 is always maintained in proper location in respect to U-shaped handle 88 and line-engaging plate 100.

Now referring to FIG. 12, when float 40' is used with a straight line 30, 31, either on the port side or the starboard side of vessel 10, end hooks 66 are located in inside holes 220 of both left mounting ear 200 and right mounting ear 201. Rod 76 is thus in substantial lengthwise alignment with float body 52'. As in FIGS. 1–9, straight line 30, 31 is attached to the ends of float 40' by end hooks 66 and rod intermediate bent portions 92 and rod terminal end portions 94, which terminal end portions are engaged in mounting ear outside holes 226 when rod 76 is in the line-retaining position shown in FIG. 12.

To correspond to the lengthwise orientation of rod 76 when float 40' is adjusted to be used with straight line 30, 31, as shown in FIG. 12, central mounting plate 78 and backing plate 230 are positioned so that bell crank threaded leg 237 extends through second crank receiving hole 240. In this particular orientation of central mounting plate 78 and backing plate 230, central hooks 84 which extend through central mounting plate holes 80, bottom plates slots 234 and backing plate holes 232, are in alignment with end hooks 66 to rotatably mount rod 76. Straight line 30, 31 is retained against lengthwise movement in respect to float 40' by being clamped between line-engaging plate 100 and central mounting plate 78 when handle 88 is locked in line-retaining position by bell crank 102 which is shown in FIG. 12.

When fishing float 40' is adjusted to be used in conjunction with sheer fishing line 42, 43 on the port side of vessel 10, as shown in FIG. 13, one end hook 66 is detachably connected to left mounting ear 200 through inside hole 222, and a second end hook 66 is connected to right mounting ear 201 through inside hole 218; corresponding terminal rod ends 94 are engageable, respectively, in left mounting ear outside hole 228 and right mounting ear outside hole 224. To maintain central hooks 84 in proper alignment with end hooks 66, central mounting plate 78 and backing plate 230 are positioned so that bell crank threaded shaft 237 extends through bottom plate first crank receiving hole 238.

When float 40' is adjusted to be used with a sheer fishing line on the starboard side of vessel 10, as shown in FIG. 11, one end hook 66 is detachably connected to left mounting ear 200 through inside hole 218 and a second end hook 66 is detachably connected to right mounting ear 201 through inside hole 222, located in the portion of said right mounting ear extending laterally beyond the envelope of float body 52'; the corresponding rod terminal ends 94 are engageable, respectively, into left mounting ear outside hole 228. With central mounting plate 78 and backing plate 230 properly positioned in respect to rod 76 so that central hooks 84 are aligned with end hooks 94, bell crank threaded shaft 237 extends through bottom plate third crank receiving hole 242.

As previously mentioned, fishing float 40' shown in FIGS. 10 through 13 can be adjusted to be used with either straight line 30, 31 or port sheer fishing line 42, 43, or starboard sheer fishing line 42, 43. To readjust float 40' for use with a different fishing line, for instance, from the port side sheer line of FIG. 13 to the starboard side sheer line of FIG. 11, is a fairly simple and fast operation. First, bottom plate assembly 204 is removed from float body 52' by unscrewing nut means 58 from bolt means 56 at left mounting ear 200 and right mounting ear 201. Bell crank 102 is next removed from bottom plate assembly 54' by unscrewing nuts 250. Double nuts 86, which secure central hooks 84 to bottom plate assembly 204, are loosened. Thereafter, end hook 66 is removed from left mounting ear inside hole 222 by unscrewing double nuts 72 and end hook 66 is removed from right mounting ear inside hole 218 by unscrewing double nuts 72; rod terminal end portions 94 are removed from left mounting ear outside hole 228 and right mounting ear outside hole 224 and repositioned in, respectively, left mounting ear outside hole 224 and right mounting ear outside hole 228 as shown in FIG. 11. Because bottom plate 54' is provided with slots 234, through which central hooks 84 extend, central mounting plate 78 and backing plate 30 are free to pivot with rod 76 to the position shown in FIG. 11. One end hook 66 is now reconnected to left mounting ear 200 through inside hole 218, and the second end hook 66 is reconnected to right mounting ear 201 through inside hole 222. Bell crank 102 is next remounted on bottom plate assembly 204 through third crank receiving hole 242 and then central hook retaining nuts 86 are retightened. Finally, bottom plate assembly 204 is remounted on float body 52' by threading bolt means 56 through holes 57' located in left mounting ear 200 and right mounting ear 201 and then nut means 58 are reattached to said bolt means.

To aid in lifting and supporting float 40' during attachment to and detachment from a fishing line, a slot 252 is provided in float body 52', as shown in FIG. 10. Said slot, with its length parallel to the length of float body 52', extends through the width of said float body at a location generally centrally along the length of said float body and adjacent to the bottom surface of said float body. The width of said slot is sized to conveniently receive the hand of the operator during attachment of float 40' to, or detachment from, a fishing line.

SUMMARY

Thus, I have provided a fishing float 40 having a height and length to guide or steer a fishing trolling line, as a straight line 30, 31 or a fishing trolling sheer line 42, 43, each having fishing gear thereon. In the first embodiment, the bottom or surface plate 54 of the float has a pair of holes 62, 64 through each end portion thereof and with the holes 62 extending through a central end portion and the other holes 64 extending through a side portion and with the other holes 64 extending through opposite end portions and to the same side of the bottom plate 54. Two end hooks 66 are detachably connected with said plate 54 and with each of said end hooks 66 disposed in a hole selected from said holes 62 and 64 and with an end hook 66 disposed at each opposite end portion of the plate 54. A central mounting plate 78 is provided having rod pivotal mounting means, as central hooks 84, carried by said plate 54. A longitudinally extending rod 76 is mounted for pivotal axial movement thereof in the end hooks 66 and by mounting means carried by the central plate 78, the rod 76 having main body portions 90 and with a handle on said rod 76, as U-shaped portion 88. The end portions of the rod 76 have intermediate bent portions 92 lying in the plane of the main rod body portions 90 and the said rods 76 have terminal bent portions 94 which extend normal to the intermediate bent portions 92 and which terminal arcuate rod end portions 94 project toward the plate 54.

Preferably, the handle for the rod 76 is a U-shaped, central, integral portion of said rod 76.

A catch member, such as bell crank 102, is mounted on said central mounting plate 78 and a portion of said bell crank, such as the arm portion 104, is movable into and out of blocking position of the handle 88 so that said handle and the rod 76 can be locked in a desired operative position.

More specifically, the U-shaped handle 88 is movable into flush position against the central mounting plate 78, and the bell crank catch member 102 is movable into and out of engagement with the U-shaped handle 88 when the same is flush against the central mounting plate 78.

In order to positively ensure that a guide line will be held between the bottom plate member 54 and laterally between the terminal arcuate end portion 94 of the rod 76 and the end hooks 66, additional holes 96 and 98 are provided in the bottom plate 54 and said holes are aligned in the path of travel of the terminal end portion 94 of rod 76 permitting travel of such terminal rod end portions 94 into said holes and permitting contact of the intermediate bent portion 92 of the rods 76 with the bottom surface plate 54.

Preferably, the bottom and top surface plate members 54 and 60 are detachably secured to the float 40.

The deep fishing line 20, straight lines 30, 31, and sheer lines 42, 43, and the tag and gurdy lines connected therewith are generally braided steel lines for desired strength whereas, the leader lines, as 26, 36, and 48, are generally transparent lines such as monofilament. However, as this invention relates to structural changes in the floats, the description of other parts is made to demonstrate the utility of the invention but not as a limitation of the invention.

Obviously, changes may be made in the forms, dimensions, and arrangements of the parts of my invention without departing from the principle thereof, the above setting forth only a preferred form of embodiment of my invention.

In a second embodiment, a mounting ear 200 or 201 is fixedly attached transversely to each end of the bottom plate 54' to extend laterally beyond the side of said bottom plate. Three pairs of holes are spaced along the length of the mounting ears 200, 201 with one pair of said holes located in the portion of the mounting ear extending laterally beyond the side of bottom plate 54'. An end hook 66 is detachably connected to each mounting ear 200, 201 with one of said end hooks 66 disposed in a selected inside hole 218, 200 or 222 of the pairs of said holes. The corresponding terminal end portions 94 of rod 76 are engageable into the matching outside holes 224, 226 or 228 of said pairs of mounting ear holes. A backing plate 230 cooperates with central mounting plate 78 to carry central hooks 84 in alignment with the selected orientation of rod 76 as determined by the location of end hooks 66. Float body 52' is provided with a slot or hand hold 252 located centrally along the length of float body 52' and adjacent to bottom plate assembly 204. Said slot is sized large enough to enable a fisherman's hand to extend therethrough while supporting float 40' during attachment to and detachment from a moving fishing line.

What is claimed is:

1. In combination with a fishing float body having a height and length to guide or steer a fishing line with fishing gear attached thereon;

(a) a bottom surface plate detachably secured to said float, said bottom plate having a plurality of pairs of holes in each end portion of said bottom plate, said pairs of holes spaced laterally across the width of said bottom plate;

(b) an end hook member receivable by a first hole of a selected pair of holes in each end portion of said bottom plate for detachable connection thereto;

(c) an elongate, flexible rod connected to said bottom plate by said two end hook members for permitting partial rotation of said rod about its longitudinal axis, the alignment of said rod with respect to said bottom plate being determined by the selection of pairs of holes in each end portion of said bottom plate for detachably connecting said end hook members thereto, said rod including:

(1) a main body portion having an integral, U-shaped handle portion extending transversely of the length of said rod, and (2) line engaging curved end portions receivable in a second hole of each of said selected pair of mounting holes;

(d) a central mounting plate detachably connected to said bottom plate;

(e) a plurality of central hook members engageable with holes provided in said central mounting plate for detachably connecting said central hook members to said bottom plate, said central hook members cooperating with said end hook members to pivotally connect said rod to said bottom plate; and (f) latch means carried by said central mounting plate, said latch means being cooperatively engageable with said rod handle to maintain said rod in fishing line retaining position, and disengageable from said rod handle to permit said rod to rotate to fishing line receiving position.

2. The combination of claim 1, wherein said first hole of a first pair of holes in each end portion of said bottom plate extends through a lateral edge portion of said bottom plate, and wherein said first hole of a second pair of holes in each end portion of said bottom plate extends through a laterally central portion of said bottom plate.

3. In combination with a buoyant fishing float body having a height and length sufficient to guide or steer a fishing line with fishing gear attached thereto;
(a) a bottom plate assembly having,
 (1) an elongate bottom plate connected to the bottom surface of said float body,
 (2) a mounting ear attached transversely to each end of said bottom plate to extend laterally beyond said bottom plate;
(b) end fastener means attachable to each of said mounting ears in selective positions along the length of each of said mounting ears, including the portion of each of said mounting ears extending laterally beyond said bottom plate;
(c) an elongate rod mounted on said bottom plate assembly by said end fastener means for permitting said rod to shift between a fishing line retaining position and a fishing line receiving position, the angular orientation of said rod with respect to said bottom plate assembly being determined by the selected positioning of said end fastener means along the length of each of said mounting ears, said rod including,
 (1) handle means extending transversely to the length of said rod, and
 (2) retaining means located at each end portion of said rod for restraining the fishing line against lateral movement in respect to said bottom plate assembly; and
(d) securing means dependently positionable in response to the orientation of said rod, said securing means cooperating with said rod handle for maintaining said rod in a fishing line engaging position and for permitting said rod to assume a fishing line receiving position.

4. The combination of claim 3, wherein said securing means includes:
(a) a central mounting plate mounted on the surface of said bottom plate opposite the float body,
(b) central fastener means carried by said central mounting plate and cooperating with said end fastener means to connect said rod to said bottom plate,
(c) clearance means in said bottom plate for permitting said central fastener means to be carried by said central mounting plate while said central mounting plate is angularly adjusted to a position coinciding with the selected angular orientation of said rod, and
(d) latch means carried by said central mounting plate, said latch means being engageable with said rod handle to maintain said rod in fishing line retaining position, and disengageable from said rod handle to permit said rod to shift to fishing line receiving position.

5. In combination with a buoyant fishing float body having a height and length sufficient to guide or steer a fishing line with fishing gear attached thereto:
(a) a bottom plate assembly having,
 (1) an elongated bottom plate detachably connected to the bottom surface of said float body,
 (2) a mounting ear fixedly attached transversely to each end of said bottom plate to extend laterally beyond said bottom plate, and
 (3) said mounting ear including a plurality of pairs of holes spaced along its length, at least one pair of said holes being located a distance laterally beyond the width of said bottom plate;
(b) an end hook member receivable by the first hole of a selected pair of mounting ear holes in each of said mounting ears for detachable connection thereto;
(c) an elongated rod connected to said bottom plate assembly by said two end hooks and permitting partial rotation of said rod about its longitudinal axis, the angular orientation of said rod with respect to said bottom plate assembly being determined by selection of pairs of mounting ear holes in each mounting ear for detachably connecting said end hooks, said rod including a main body portion having a transversely extending handle, and including line curved end portions engageable with the second hole of each of said selected pair of mounting ear holes;
(d) a central mounting plate assembly rotatively connected to said bottom plate assembly in a selected position coinciding with the angular orientation of said rod; and
(e) a plurality of central hooks carried by said central mounting plate assembly and cooperating with said end hooks to pivotally connect said rod to said bottom plate assembly.

6. The combination of claim 5, including a latch means carried by said central mounting plate assembly, said latch means being engageable with said rod handle to maintain said rod in fishing line retaining position, and disengageable from said rod handle to permit said rod to rotate to fishing line receiving position.

7. The combination of claim 5, wherein a portion of both mounting ears extend laterally beyond the same side of the bottom plate, the bottom plate assembly including an angle brace for buttressing the laterally extending portion of said mounting ears to said bottom plate.

8. The combination of claim 5 wherein the central mounting plate assembly includes:
(a) a central mounting plate adjacent to the surface of the bottom plate opposite the float body, said central mounting plate having receiving means for receiving the central hooks, and
(b) a backing plate adjacent to the surface of the bottom plate adjoining the float bottom, said backing plate also having receiving means for receiving the central mounting hooks; and
(c) clearance means in said bottom plate for maintaining said central mounting hooks in engagement with both said central mounting plate and said backing plate while said central mounting plate assembly is angularly adjusted to a position coinciding with the selected angular orientation of the rod.

9. The combination of claim 8, wherein:
said central mounting plate receiving means includes two pairs of spaced holes with a central mounting hook receivable through each pair;
said backing plate receiving means includes two pairs of spaced holes in registry with said central mounting plate holes; and
said clearance means in said bottom plate including two pairs of slots in registry with the corresponding central mounting plate and backing plate receiving means holes.

10. The combination of claim 5, wherein the rod handle is U-shaped and is formed as an integral portion of the main body of said rod, said handle lying adjacent the central mounting plate when said rod is in line retaining position and adapted to be rotated away from said central mounting plate when said rod is rotated to line receiving position.

11. The combination of claim 10, including:
a line-engaging plate spanning across and fixedly attached to the rod handle for retaining the fishing line clamped between said line engaging plate and the central mounting plate, and
a latch carried by both the central mounting plate and backing plate for pivoting into and out of handle locking position when the rod is in line retaining position.

12. The combination of claim 11, wherein the latch:
includes a bell crank having a flexible arm portion bearing against the surface of the line engaging plate opposite the central mounting plate, said latch being maintained in such locking position by portions of the rod forming the two legs of the U-shaped handle which legs retain said arm portion therebetween.

13. The combination of claim 5, wherein said bottom plate is in the form of a channel, said channel having flanges for receiving the float body therebetween.

14. The combination of claim 5, wherein the float body includes means for grasping and supporting the float during attachment to and detachment from the fishing line, said means comprising a hand receiving slot positioned in the side surface of said float body.

* * * * *

UNITED STATES PATENT OFFICE
CERTIFICATE OF CORRECTION

Patent No. 4,138,793           Dated February 13, 1979

Inventor(s) William J. Kellie

It is certified that error appears in the above-identified patent and that said Letters Patent are hereby corrected as shown below:

Col. 1, line 27, change "onto" to --into-- .

Col. 7, line 11, change "32" to --43-- .

Col. 8, line 1, change "front" to --float-- .

Col. 8, line 34, change "other" to --outer-- .

Col. 8, line 34, change "flanges" to --flange-- .

Col. 10, line 35, after "52" insert --by-- .

Claim 5, line 19, after "line" insert --retaining-- .

Signed and Sealed this

Fifteenth Day of May 1979

[SEAL]

Attest:

RUTH C. MASON
Attesting Officer

DONALD W. BANNER
Commissioner of Patents and Trademarks